United States Patent
Miho

(10) Patent No.: US 12,225,450 B2
(45) Date of Patent: Feb. 11, 2025

(54) COMMUNICATION DEVICE, SERVER, CONTROL METHOD, AND COMMUNICATION SYSTEM

(71) Applicant: KYOCERA Corporation, Kyoto (JP)

(72) Inventor: Yousuke Miho, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 472 days.

(21) Appl. No.: 17/454,701

(22) Filed: Nov. 12, 2021

(65) Prior Publication Data
US 2022/0078701 A1 Mar. 10, 2022

Related U.S. Application Data

(63) Continuation of application No. PCT/JP2020/020837, filed on May 27, 2020.

(30) Foreign Application Priority Data

May 30, 2019 (JP) ................................. 2019-101523

(51) Int. Cl.
*H04W 4/00* (2018.01)
*H04W 48/16* (2009.01)
*H04W 76/25* (2018.01)
*H04L 67/12* (2022.01)

(52) U.S. Cl.
CPC ........... *H04W 48/16* (2013.01); *H04W 76/25* (2018.02); *H04L 67/12* (2013.01)

(58) Field of Classification Search
None
See application file for complete search history.

(56) References Cited

U.S. PATENT DOCUMENTS

| 10,346,332 | B2* | 7/2019 | Tanabe | G06F 13/38 |
|---|---|---|---|---|
| 2016/0100362 | A1* | 4/2016 | Palanisamy | H04W 4/70 370/311 |
| 2018/0183897 | A1* | 6/2018 | Singhal | G06F 21/6236 |
| 2019/0238536 | A1* | 8/2019 | Chilla | H04L 63/0823 |
| 2020/0015087 | A1* | 1/2020 | Pak | H04L 9/0643 |
| 2021/0409922 | A1* | 12/2021 | Keränen | H04L 67/142 |

OTHER PUBLICATIONS

"Lightweight Machine to Machine Technical Specification" Open Mobile Alliance, Feb. 8, 2017, pp. 1-138.

* cited by examiner

*Primary Examiner* — Bob A Phunkulh
(74) *Attorney, Agent, or Firm* — Studebaker & Brackett PC

(57) ABSTRACT

A communication device 100 transmits, to an LwM2M server 400, data specified by the Read command, in response to receiving a Read command from the LwM2M server 400. The communication device 100 transmits, to the LwM2M server 400, an Update message for extending a lifetime indicating a period in which communication between the communication device 100 and the LwM2M server 400 is enabled. In a case where there is transmission data from the communication device 100 to the LwM2M server 400, the communication device 100 transmits the Update message including read request information for requesting the LwM2M server 400 to read the transmission data.

6 Claims, 4 Drawing Sheets

COMMUNICATION DEVICE, SERVER, CONTROL METHOD, AND COMMUNICATION SYSTEM

RELATED APPLICATIONS

The present application is a continuation based on PCT Application No. PCT/JP2020/020837, filed on May 27, 2020, which claims the benefit of Japanese Patent Application No. 2019-101523 filed on May 30, 2019. The content of which is incorporated by reference herein in their entirety.

TECHNICAL FIELD

The present disclosure relates to a communication device, a server, a control method, and a communication system.

BACKGROUND ART

NPL 1 describes a technical specification for Lightweight Machine to Machine (LwM2M), which is a communication protocol for device management for Internet of Things (IoT) devices. LwM2M enables data exchange with a small amount of data for IoT devices. LwM2M also employs a client-server model, and is of a Pull type in which a server acquires data from clients.

CITATION LIST

Non Patent Literature

NPL 1: "Lightweight Machine to Machine Technical Specification", Open Mobile Alliance, Internet <URL: http://www.openmobilealliance.org/release/LightweightM2M/V1_0-20170208-A/OMA-TS-LightweightM2M-V1_0-20170208-A.pdf>

SUMMARY

A communication device according to a first aspect is a device configured to transmit data to a server in response to receiving a read command from the server, the data being specified by the read command. The communication device includes a communicator configured to transmit, to the server, an update request message for extending a lifetime indicating a period in which communication between the communication device and the server is enabled. The communicator is configured to transmit, in a case where there is transmission data from the communication device to the server, the update request message including read request information for requesting the server to read the transmission data.

A server according to a second aspect is a server for transmitting a read command to a communication device to acquire, from the communication device, data specified by the read command. The server includes a communicator configured to receive, from the communication device, an update request message for extending a lifetime indicating a period in which communication between the communication device and the server is enabled. The communicator is configured to receive the update request message including read request information for requesting the server to read transmission data transmitted from the communication device to the server. The communicator is configured to transmit, to the communication device, the read command for acquiring the transmission data requested by the read request information, based on reception of the update request message including the read request information.

A control method according to a third aspect is a method for a communication device that transmits data to a server in response to receiving a read command from the server, the data being specified by the read command. The control method includes the steps of transmitting, to the server, an update request message for extending a lifetime indicating a period in which communication between the communication device and the server is enabled. The transmitting includes transmitting, in a case where there is transmission data from the communication device to the server, the update request message including read request information for requesting the server to read the transmission data.

A control method according to a fourth aspect is a method for a server to transmit a read command to a communication device to acquire, from the communication device, data specified by the read command. The control method includes the steps of receiving, from the communication device, an update request message for extending a lifetime indicating a period in which communication between the communication device and the server is enabled, the update request message including read request information for requesting the server to read transmission data transmitted from the communication device to the server and transmitting, to the communication device, the read command for acquiring the transmission data requested by the read request information, based on reception of the update request message including the read request information.

A communication system according to a fifth aspect includes a server and a communication device configured to transmit data to the server in response to receiving a read command from the server, the data being specified by the read command. The communication device includes a first communicator configured to transmit, to the server, an update request message for extending a lifetime indicating a period in which communication between the communication device and the server is enabled. The first communicator is configured to transmit, in a case where there is transmission data from the communication device to the server, the update request message including read request information for requesting the server to read the transmission data. The server includes a second communicator configured to receive the update request message including the read request information. The second communicator is configured to transmit, to the communication device, the read command for acquiring the transmission data requested by the read request information, based on reception of the update request message including the read request information.

DESCRIPTION OF EMBODIMENTS

Figure 1:
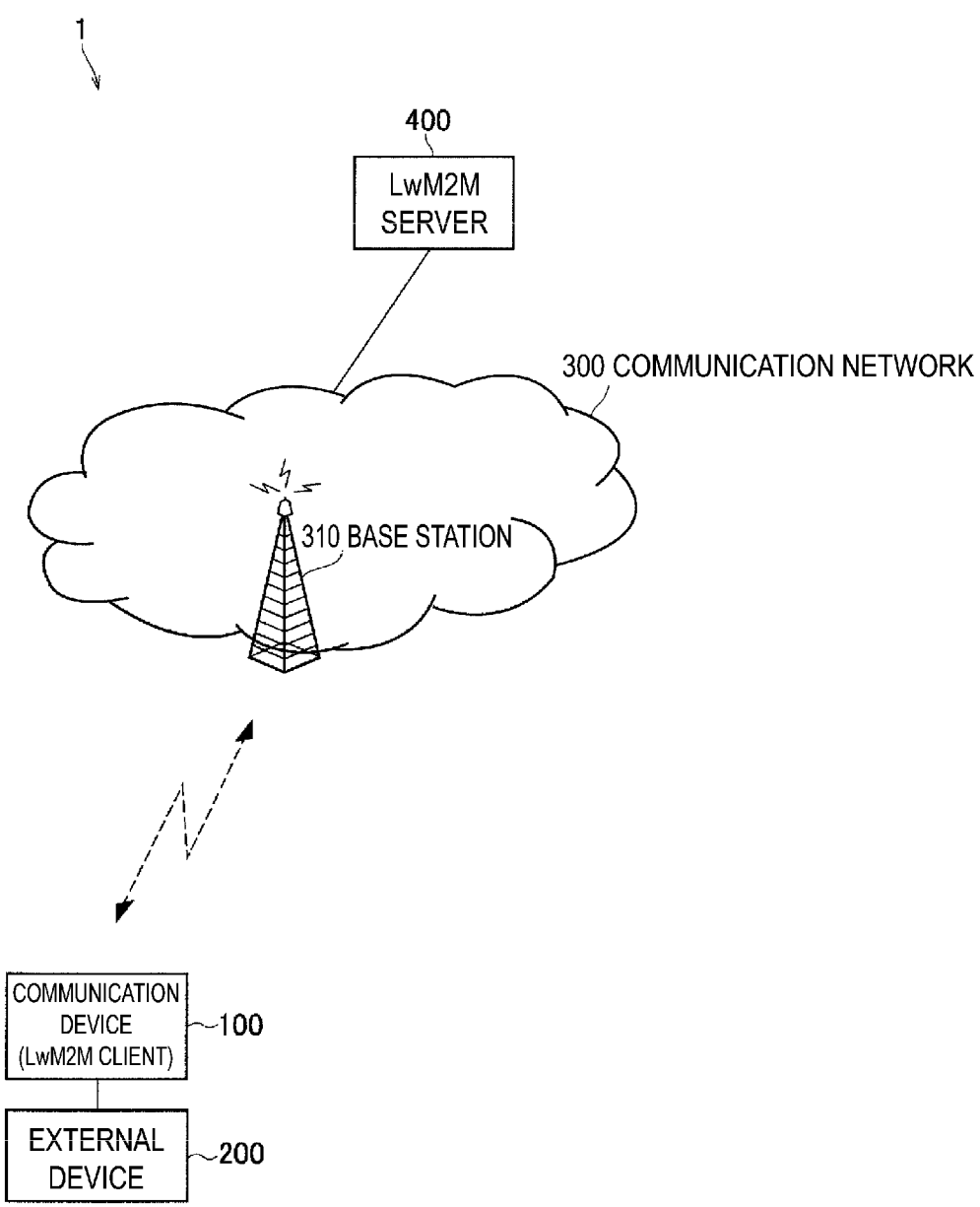
FIG. 1 is a diagram illustrating a configuration of a communication system according to an embodiment.

There is a need to transmit data from a communication device corresponding to a client to a server at any timing such that the communication device efficiently transmits the data to the server.

However, LwM2M is based on a Pull type in which the server acquires data from the communication device and does not assume that the communication device spontaneously sends data to the server. Thus, the communication device has difficulty in efficiently transmitting data to the server.

Thus, the present disclosure enables efficient data transmission to the server under the assumption of the Pull type in which the server acquires data.

Embodiments will be described with reference to the drawings. In the description of the drawings, the same or similar parts are given the same or similar reference numerals.

Configuration of Communication System

First, a configuration of a communication system according to an embodiment will be described. FIG. 1 is a diagram illustrating a configuration of a communication system 1 according to an embodiment.

As illustrated in FIG. 1, the communication system 1 includes a communication device 100, an external device 200, a communication network 300, and an LwM2M server 400. The LwM2M server 400 is an example of a server that acquires data from the communication device 100.

The communication device 100 corresponds to an LwM2M client. The communication device 100 is an IoT device including a wireless communication capability. For example, the communication device 100 includes various sensors and uploads data obtained by the sensors to the LwM2M server 400.

The communication device 100 may perform Low Power Wide Area (LPWA) scheme-based wireless communication with a communication network 300. The LPWA scheme is a scheme for achieving long-range wireless communication with reduced power consumption. The LPWA scheme is, for example, cellular LPWA, SIGFOX, or LoRaWAN. The cellular LPWA may be enhanced Machine Type Communications (Emtc) or Narrow Band-Internet of Things (NB-IoT) specified in $3^{rd}$ Generation Partnership Project (3GPP) standards.

The external device 200 is a device connected to the communication device 100. The external device 200 is connected directly to the communication device 100 or connected indirectly to the communication device 100 via a cable. The external device 200 performs, for example, Universal Asynchronous Receiver/Transmitter (UART) scheme or Universal Serial Bus (USB) scheme-based wired communication with the communication device 100.

The external device 200 is a device such as a Personal Computer (PC), sensor instrument, meter instrument, or automatic vending machine. The external device 200 executes an application for IoT. The external device 200 connected with the communication device 100 can communicate with the communication network 300 and the LwM2M server 400 via the communication device 100 even in a case where the external device 200 includes no wireless communication capability.

The communication network 300 includes a network provided by a network operator. The communication network 300 may include the Internet. The communication network 300 includes a base station 310 that communicates wirelessly with the communication device 100. FIG. 1 illustrates only one base station 310 included in the communication network 300. However, the communication network 300 includes a plurality of base stations 310.

The LwM2M server 400 manages the communication device 100 corresponding to an LwM2M client, via the communication network 300 based on the LwM2M standard. LwM2M employs a client-server model, and the LwM2M server 400 performs Pull type acquisition in which the LwM2M server 400 acquires data from the communication device 100 corresponding to an LwM2M client.

The LwM2M server 400 transmits, to the communication device 100, mainly four commands described below.

1) Read:
Read command for acquiring data from the communication device 100.
2) Write:
Write command for writing data and parameters to the communication device 100.
3) Execute:
Execution command for causing the communication device 100 to perform processing such as re-activation.
4) Observe:
Notification instruction command that corresponds to an expanded version of the Read command and that instructs notification, to the LwM2M server 400, of data specified by the LwM2M server 400 at a timing when the data is changed or at specified time intervals.

In the communication system 1, a lifetime is held by both the LwM2M server 400 and the communication device 100 in consideration of a state in which the communication device 100 fails to communicate. The state in which the communication device 100 fails to communicate refers to, for example, a state in which the communication device 100 is outside a range, a state in which the communication device 100 is in a sleep mode to reduce power consumption, and/or the like. The communication device 100 extends the lifetime by updating registration (Update) in the LwM2M server 400 before the lifetime ends.

Three messages described below are transmitted from the communication device 100 to the LwM2M server 400.

1) Register:
Registration request message for the first registration in the LwM2M server 400.
2) Update:
Update request message for extension of the lifetime.
3) Notify:
Notification message corresponding to the Observe command and notifying data.

The communication device 100 transmits, to the LwM2M server 400, the Register message and the Update message assigned several parameters. The parameters are, for example, the lifetime described above, the numbers of objects supported, and the like.

Note that the communication device 100 manages data in the form of a resource model. The resource model is a tree structure of objects, object instances, and resources. The elements are assigned the respective numbers. For example, a resource representing the manufacturer of the device is represented as /3/0/0, meaning the third object, the zeroth object instance, and the zeroth resource. In response to receiving, from the LwM2M server 400, the Read command specifying /3/0/0, the communication device 100 returns the manufacturer data of the communication device 100 to the LwM2M server 400.

Configuration of Communication Device

Figure 2:
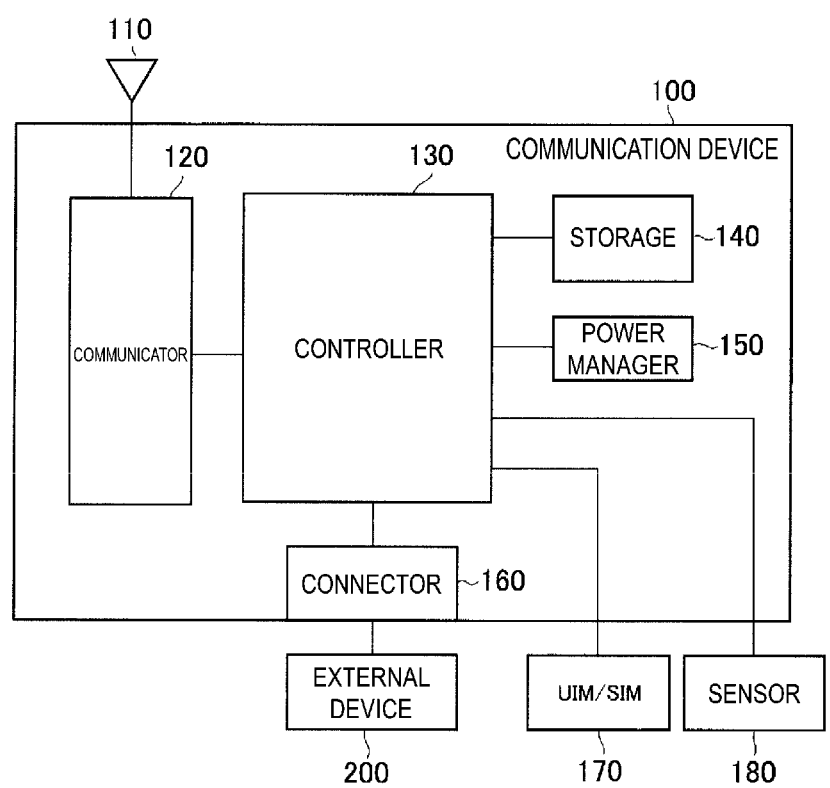
FIG. 2 is a diagram illustrating a configuration of a communication device according to an embodiment.

Now, a configuration of the communication device 100 according to an embodiment will be described. FIG. 2 is a diagram illustrating a configuration of the communication device 100 according to an embodiment.

As illustrated in FIG. 2, the communication device 100 includes an antenna 110, a communicator 120, a controller 130, a storage 140, a power manager 150, and a connector 160. The communication device 100 can connect to a UIM/SIM 170 and a sensor 180 via an interface not illustrated.

The antenna 110 is used to transmit and receive radio signals. The communicator 120 communicates wirelessly with the base station 310 under the control of the controller 130, and communicates with the LwM2M server 400 via the base station 310. The communicator 120 performs amplification processing, filter processing, and the like on a radio signal received by the antenna 110 from the base station 310, converts the radio signal into a baseband signal, and outputs the baseband signal to the controller 130. The communicator 120 converts the baseband signal input from the controller 130 into a radio signal, performs amplification processing and the like on the radio signal, and transmits the resultant signal from the antenna 110.

The communicator 120 performs LwM2M standard based communication with the LwM2M server 400. For example, the communicator 120 receives any of the Read command, the Write command, the Execute command, and the Observe command from the LwM2M server 400. The communicator 120 transmits any of the Register message, the Update message, and the Notify message to the LwM2M server 400.

The controller 130 performs various types of processing and control for the communication device 100. For example, the controller 130 controls the communicator 120 to communicate wirelessly with the base station 310 in accordance with the LPWA scheme. The controller 130 includes at least one processor. The processor may include a baseband processor and a central processing unit (CPU). The baseband processor performs modulation and demodulation, and coding and decoding of a baseband signal, and the like. The CPU executes the programs stored in the storage 140 to perform various types of processing.

The controller 130 performs processing based on the LwM2M standard. For example, in response to reception, by the communicator 120, of any of the Read command, the Write command, the Execute command, and the Observe command, the controller 130 performs processing corresponding to the command received. Additionally, the controller 130 generates any of the Register message, the Update message, and the Notify message, and outputs the message generated to the communicator 120. The controller 130 manages the lifetime, and extends the lifetime by updating registration (Update) in the LwM2M server 400 before the lifetime ends.

The storage 140 includes a volatile memory and a non-volatile memory, and stores programs executed by the controller 130, and information and data used for processing by the controller 130.

The power manager 150 includes a battery and peripheral circuitry for the battery. The power manager 150 supplies drive power for the communication device 100. Note that in a case where the communication device 100 is connected to the external device 200 via USB, the drive power may be supplied from the external device 200 through USB power supply.

The connector 160 is an interface for electrically connecting to the external device 200. With the external device 200 electrically connected to the connector 160, the controller 130 executes transfer processing for data transmitted to and received from the communication network 300 by the external device 200.

The UIM/SIM 170 stores subscriber information needed to communicate with the communication network 300, and the like.

The sensor 180 includes a plurality of types of sensors, and measures temperature, humidity, atmospheric pressure, illuminance, acceleration, and/or geomagnetic fields to output data including the measurement values. The data output by the sensor 180 is stored in the storage 140 via the controller 130. The controller 130 manages data stored in the storage 140.

Configuration of LwM2M Server

Figure 3:
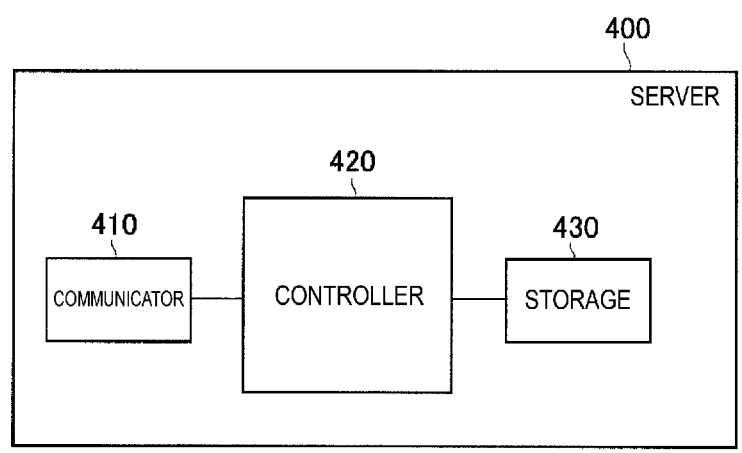
FIG. 3 is a diagram illustrating a configuration of an LwM2M server according to an embodiment.

Now, a configuration of the LwM2M server 400 according to an embodiment will be described. FIG. 3 is a diagram illustrating the configuration of the LwM2M server 400.

As illustrated in FIG. 3, the LwM2M server 400 includes a communicator 410, a controller 420, and a storage 430.

The communicator 410 is connected by wire or wirelessly to the communication network 300. The communicator 410 communicates with the LwM2M server 400 via the communication network 300 under the control of the controller 420.

The communicator 410 communicates with the communication device 100 based on the LwM2M standard. For example, the communicator 410 transmits any of the Read command, the Write command, the Execute command, and the Observe command to the communication device 100. The communicator 410 receives any of the Register message, the Update message, and the Notify message from the communication device 100.

The controller 420 performs various types of processing and control for the LwM2M server 400. The controller 420 includes at least one processor. The processor executes the programs stored in the storage 430 to perform various types of processing.

The controller 420 performs processing based on the LwM2M standard. For example, in response to reception, by the communicator 410, of any of the Register message, the Update message, and the Notify message, the controller 420 performs processing corresponding to the message received. In addition, the controller 420 generates any of the Read command, the Write command, the Execute command, and the Observe command, and outputs the message generated to the communicator 410.

The storage 430 includes a volatile memory and a non-volatile memory, and stores programs executed by the controller 420, and information and data used for processing by the controller 420.

Operations of Communication System

Now, operations of the communication system 1 according to an embodiment will be described.

The communication system 1 is based on the Pull type in which the LwM2M server 400 acquires data from the communication device 100, and it is difficult to transmit any data from the communication device 100 to the LwM2M server 400 at any timing.

As a measure, the LwM2M server 400 may periodically transmit the Read command to increase the frequency of data transmission from the communication device 100 to the LwM2M server 400. However, in a case where the communication device 100 is in a sleep state at timing for transmission of the Read command, data fails to be acquired at an expected timing. In a case where a Network Address Translation (NAT) apparatus is located between the LwM2M server 400 and the communication device 100, data can be transmitted from the communication device 100 to the LwM2M server 400, but the command may not necessarily be transmitted from the LwM2M server 400 to the communication device 100.

On the other hand, the Observe command allows the communication device 100 to notify the LwM2M server 400 of data at time intervals specified by the LwM2M server 400. However, two timers are required per Observe command, in other words, per resource (one data).

A first timer relates to a minimum changeability time (pmin). The communication device 100 does not notify data until the minimum changeability time (pmin) elapses even in a case where the value of the data changes. Setting the minimum changeability time (pmin) allows prevention of an excessive increase in frequency of the notification. A second timer relates to a maximum unchangeability time (pmax). Even in a case where the value of the data does not change, the communication device 100 inevitably notifies the data when the maximum unchangeability time (pmax) elapses. Setting the maximum unchangeability time (pmax) allows for periodic check of the data.

Thus, with the Observe command, in a case where the LwM2M server 400 is to acquire, from the communication device 100, a plurality of types of data corresponding to a plurality of types of resources, the communication device 100 needs to manage a large number of timers, leading to an increased processing load. In addition, the Observe command allows notification timing to be configured only at time intervals, and thus specifying a specific point in time for notification is difficult.

Accordingly, in a case where an abnormality is detected on the communication device 100 side, for example, the communication system 1 has difficulty in notifying the LwM2M server 400 of data regarding the abnormality in real time.

Thus, in an embodiment, by utilizing the Update message to prompt the LwM2M server 400 to transmit the Read command, a pseudo-Push transmission from the communication device 100 to the LwM2M server 400 is achieved. The Update message is originally a message for extending the lifetime (Lifetime) indicating a period in which communication between the communication device 100 and the LwM2M server 400 is enabled.

Figure 4:
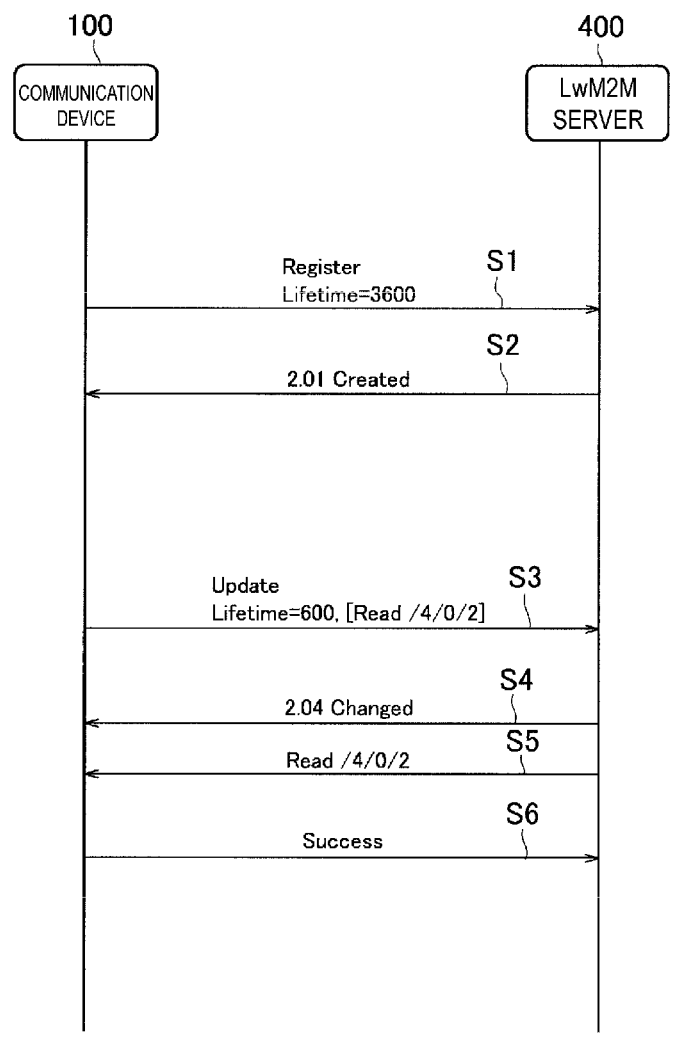
FIG. 4 is a diagram illustrating a communication sequence according to an embodiment.

FIG. 4 is a diagram illustrating a communication sequence according to an embodiment.

Step S1

In the communication device 100, the controller 130 generates a Register message, and the communicator 120 transmits the Register message to the LwM2M server 400. In this regard, the Register message is a registration request message for the first registration transmitted to the LwM2M server 400. The Register message includes the first lifetime (Lifetime) as a parameter value. In the LwM2M server 400, the communicator 410 receives the Register message, and the controller 420 processes the Register message.

Step S2

At the LwM2M server 400, the controller 420 generates a response code (2.01 Created) indicating that the Register processing has been completed, and the communicator 410 transmits the response code (2.01 Created) to the communication device 100. In the communication device 100, the communicator 120 receives the response code (2.01 Created).

Step S3

In the communication device 100, the controller 130 determines that a need has arisen to transmit, to the LwM2M server 400, data corresponding to a particular resource. For example, the controller 130 detects that the data has indicated an abnormal value or that timing pre-specified for the data has been reached, to determine that a need has arisen to transmit the data to the LwM2M server 400. In this regard, the particular resource is a resource /4/0/2, in other words, a received signal strength (RSSI).

The controller 130 generates an Update message, and the communicator 120 transmits the Update message to the LwM2M server 400. The Update message includes an updated lifetime (Lifetime) as a parameter value. Although an example in which the lifetime (Lifetime) is "600" is illustrated here, the lifetime (Lifetime) may be omitted in a case where the lifetime (Lifetime) need not actually be extended.

The Update message includes read request information for requesting the LwM2M server 400 to read the transmission data transmitted from the communication device 100 to the LwM2M server 400. In the example of FIG. 4, the read request information is "Read /4/0/2." "Read /4/0/2" indicates requesting the LwM2M server 400 to read a resource /4/0/2, i.e., RSSI data. Here, "/4/0/2" corresponds to a data identifier that identifies the type of transmission data that the LwM2M server 400 is requested to read.

In the present operation example, the LwM2M server 400 is requested to read one type of transmission data, but in a case where the LwM2M server 400 is requested to read a plurality of types of transmission data, the controller 130 includes, in addition to "/4/0/2," other data identifiers in the Update message. In other words, the controller 130 may include, in the Update message, a plurality of data identifiers corresponding to a plurality of types of transmission data (a sequence of multiple commands).

Then, in the LwM2M server 400, the communicator 410 receives the Update message, and the controller 420 processes the Update message. The controller 420 updates the lifetime (Lifetime) in accordance with the Update message, and determines that the communication device 100 is requesting reading of the resource /4/0/2, in other words, the RSSI data. In a case where the Update message includes a plurality of data identifiers (a sequence of multiple commands), the controller 420 determines that the communication device 100 requests the reading of the data indicated by each data identifier.

Step S4

In the LwM2M server 400, the controller 420 generates a response code (2.04 Changed) indicating that the Update processing is completed, and the communicator 410 transmits the response code (2.04 Changed) to the communication device 100. In the communication device 100, the communicator 120 receives the response code (2.04 Changed).

Step S5

In the LwM2M server 400, based on the reception of the Update message including the read request information, the controller 420 transmits, to the communication device 100, the Read command for acquiring the transmission data requested by the read request information. The Read command indicates reading of resource /4/0/2, i.e., RSSI data. Note that in a case where the Update message includes a plurality of data identifiers (a sequence of multiple commands), the controller 420 sequentially transmits the Read commands to the communication device 100 for respective data identifiers.

In the communication device 100, the communicator 120 receives the Read command, and the controller 130 processes the Read command.

Step S6

The controller 130 reads the RSSI data from the storage 140 in accordance with the resource /4/0/2 specified by the Read command, generates a response (Success) including the RSSI data, and outputs the response (Success) to the communicator 120. The communicator 120 transmits the response (Success) to the LwM2M server 400. In the LwM2M server 400, the communicator 410 receives the response (Success), and the controller 420 processes the response (Success) and acquires the RSSI data.

In this way, in response to receiving the read command from the LwM2M server 400, the communication device 100 transmits, to the LwM2M server 400, the data specified by the read command. The communication device 100 transmits, to the LwM2M server 400, the Update message for extending the lifetime indicating the period in which the communication between the communication device 100 and the LwM2M server 400 is enabled. In a case where there is transmission data from the communication device 100 to the LwM2M server 400, the communication device 100 transmits the Update including the read request information for requesting the LwM2M server 400 to read the transmission data.

In response to receiving the Update message including the read request information for requesting the LwM2M server 400 to read the transmission data transmitted from the communication device 100 to the LwM2M server 400, the LwM2M server 400 transmits the Read command for acquiring the transmission data requested by the read request information, to the communication device 100 based on the reception of the Update message including the read request information.

This enables efficient data transmission to the LwM2M server 400 under the assumption of the Pull type in which the LwM2M server 400 acquires data.

Modified Example

In the above-described embodiment, the example has been described in which the Update message is utilized to prompt the LwM2M server 400 to transmit the Read command. However, in a case of having received the Observe command from the LwM2M server 400, the communication device 100 may also utilize the Notify message to prompt the LwM2M server 400 to transmit the Read command.

Specifically, in the communication device 100, in response to receiving the Observe command from the LwM2M server 400, the communicator 120 transmits the Notify message including the data specified by the Observe command, to the LwM2M server 400 at the timing of a change in the data specified by the Observe command and at time interval specified by the Observe command.

In this regard, in a case where there is transmission data other than the data specified by the Observe command when the Notify message is transmitted, the controller 130 includes, in the Notify message, the read request information for requesting the LwM2M server 400 to read the transmission data. In this case, the read request information includes a data identifier for the transmission data.

In the LwM2M server 400, the communicator 410 receives the Notify message, and the controller 420 processes the Notify message. Based on the read request information included in the Notify message, the controller 420 determines that the communication device 100 requests reading of the specific transmission data. Then, based on the reception of the Notify message including the read request information, the controller 420 transmits, to the communication device 100, the Read command for acquiring the transmission data requested by the read request information.

This enables efficient data transmission to the LwM2M server 400 under the assumption of the Pull type in which the LwM2M server 400 acquires data.

Other Embodiments

In the second embodiment described above, an example has been described in which the communication device 100 communicates with the LwM2M server 400 by wireless communication. However, the communication device 100 may communicate with the LwM2M server 400 by wired communication.

Additionally, in the second embodiment described above, the communication system 1 based on the LwM2M standard has been described.

However, any standard or protocol may be used that is based on the Pull type in which a server acquires data from a communication device, and no limitation to the LwM2M standard is intended.

A program may be provided that causes a computer to execute each of the processing performed by the communication device 100 or the LwM2M server 400. The program may be recorded on a computer readable medium. The program can be installed in a computer by using the computer readable medium. Here, the computer readable medium on which the program is recorded may be a non-transitory recording medium. Although the non-transitory recording medium is not limited to a particular one, a recording medium, for example, a CD-ROM, a DVD-ROM, or the like may be adopted. In addition, the functioners (circuits) for executing the processing performed by the communication device 100 may be integrated, and the communication device 100 may be configured as a semiconductor integrated circuit (a chipset or an SoC).

Embodiments have been described above in detail with reference to the drawings, but specific configurations are not limited to those described above, and various design modifications can be made without departing from the gist of the present disclosure.

The invention claimed is:

1. A communication device for transmitting data to a server in response to receiving a read command from the server, the data being specified by the read command, the communication device comprising:
a communicator configured to:
transmit, to the server, an update request message for extending a lifetime indicating a period in which communication between the communication device and the server is enabled, the update request message includes a value of an extended lifetime;
transmit, in a case where there is transmission data from the communication device to the server, the update request message including read request information for requesting the server to read the transmission data, the read request information including a data identifier identifying a type of the transmission data that the server is requested to read;
receive, from the server, a read command for acquiring the transmission data requested by the read request information, the type of the transmission data identified by the data identifier included in the read request information; and transmit, to the server, a response including the transmission data requested by the read request information in response to receiving the read command, the type of the transmission data identified by the data identifier included in the read request information, wherein, the communicator is configured to:

receive, from the server, a notification instruction command including information for specifying data included in a notification message;

after receiving the notification instruction command from the server, transmit, to the server, the notification message including the data specified by the notification instruction command, at a timing when the data specified by the notification instruction command is changed and at a time interval specified by the notification instruction command; and in a case where there is transmission data other than the data specified by the notification instruction command when the notification message is transmitted, transmit the notification message including the read request information, the read request information including a data identifier identifying a type of the transmission data that the server is requested to read.

2. The communication device according to claim 1, wherein the read request information includes a data identifier identifying a type of the transmission data that the server is requested to read.

3. The communication device according to claim 2, wherein in a case where the server is requested to read a plurality of types of the transmission data, the read request information includes a plurality of data identifiers respectively corresponding to the plurality of types of transmission data.

4. A server for transmitting a read command to a communication device to acquire, from the communication device, data specified by the read command, the server comprising:

a communicator configured to receive, from the communication device, an update request message for extending a lifetime indicating a period in which communication between the communication device and the server is enabled, the update request message includes a value of an extended lifetime, wherein the communicator is configured to receive the update request message including read request information for requesting the server to read transmission data transmitted from the communication device to the server, the read request information including a data identifier identifying a type of the transmission data that the server is requested to read, the communicator is configured to transmit, to the communication device, the read command for acquiring the transmission data requested by the read request information, based on reception of the update request message including the read request information, the type of the transmission data identified by the data identifier included in the read request information, and the communicator is configured to receive, from the communication device, a response including the transmission data requested by the read request information, the type of the transmission data identified by the data identifier included in the read request information, wherein, the communicator is configured to:

transmit, to the communication device, a notification instruction command including information for specifying data included in a notification message;

after transmitting the notification instruction command to the communication device, receive, from the communication device, the notification message including the data specified by the notification instruction command, at a timing when the data specified by the notification instruction command is changed and at a time interval specified by the notification instruction command; and in a case where there is transmission data other than the data specified by the notification instruction command when the notification message is transmitted, receive the notification message including the read request information, the read request information including a data identifier identifying a type of the transmission data that the server is requested to read.

5. A control method for a communication device that transmits data to a server in response to receiving a read command from the server, the data being specified by the read command, the control method comprising:

transmitting, to the server, an update request message for extending a lifetime indicating a period in which communication between the communication device and the server is enabled, the update request message includes a value of an extended lifetime, wherein the transmitting includes transmitting, in a case where there is transmission data from the communication device to the server, the update request message including read request information for requesting the server to read the transmission data, the read request information including a data identifier identifying a type of the transmission data that the server is requested to read;

receiving, from the server, a read command for acquiring the transmission data requested by the read request information, the type of the transmission data identified by the data identifier included in the read request information; and transmitting, to the server, a response including the transmission data requested by the read request information in response to receiving the read command, the type of the transmission data identified by the data identifier included in the read request information, wherein the control method further comprising:

receiving, from the server, a notification instruction command including information for specifying data included in a notification message;

after receiving the notification instruction command from the server, transmitting, to the server, the notification message including the data specified by the notification instruction command, at a timing when the data specified by the notification instruction command is changed and at a time interval specified by the notification instruction command; and in a case where there is transmission data other than the data specified by the notification instruction command when the notification message is transmitted, transmitting the notification message including the read request information, the read request information including a data identifier identifying a type of the transmission data that the server is requested to read.

6. A communication system comprising:

a server; and a communication device configured to transmit data to the server in response to receiving a read command from the server, the data being specified by the read command, wherein the communication device includes a first communicator configured to transmit, to the server, an update request message for extending a lifetime indicating a period in which communication between the communication device and the server is enabled, the update request message includes a value of an extended lifetime, and the first communicator is configured to transmit, in a case where there is transmission data from the communication device to the server, the update request message including read request information for requesting the server to read the transmission data, the read request information including a data identifier identifying a type of the transmission data that the server is requested to read, and the server includes a second communicator configured to receive the update request message including the read request information, the second communicator is configured to transmit, to the communication device, the read command for acquiring the transmission data requested by the read request information, based on reception of the update request message including the read request information, the type of the transmission data identified by the data identifier included in the read request information, and the second communicator is configured to receive, from the communication device, a response including the transmission data requested by the read request information wherein, the first communicator is configured to:

receive, from the server, a notification instruction command including information for specifying data included in a notification message;

after receiving the notification instruction command from the server, transmit, to the server, the notification message including the data specified by the notification instruction command, at a timing when the data specified by the notification instruction command is changed and at a time interval specified by the notification instruction command; and in a case where there is transmission data other than the data specified by the notification instruction command when the notification message is transmitted, transmit the notification message including the read request information, the read request information including a data identifier identifying a type of the transmission data that the server is requested to read.

* * * * *